(12) United States Patent
Muratov et al.

(10) Patent No.: US 6,433,525 B2
(45) Date of Patent: Aug. 13, 2002

(54) DC TO DC CONVERTER METHOD AND CIRCUITRY

(75) Inventors: Volodymyr A. Muratov; Robert G. Hodgins; Thomas A. Jochum, all of Durham, NC (US)

(73) Assignee: Intersil Americas Inc., Irvine, CA (US)

( * ) Notice: Subject to any disclaimer, the term of this patent is extended or adjusted under 35 U.S.C. 154(b) by 0 days.

(21) Appl. No.: 09/846,721

(22) Filed: May 1, 2001

Related U.S. Application Data

(60) Provisional application No. 60/201,829, filed on May 3, 2000.

(51) Int. Cl.[7] ................................................. G05F 1/40
(52) U.S. Cl. ........................................ 323/282; 323/283
(58) Field of Search ................................ 323/282, 283, 323/284, 285, 288, 290, 351; 327/403, 404, 541, 543

(56) References Cited

U.S. PATENT DOCUMENTS

| | | | | |
|---|---|---|---|---|
| 5,627,460 A | * | 5/1997 | Bazinet et al. | 323/288 |
| 5,731,731 A | * | 3/1998 | Wilcox et al. | 327/403 |
| 5,870,296 A | * | 2/1999 | Schaffer | 363/65 |
| 5,912,552 A | * | 6/1999 | Tateishi | 323/285 |
| 5,994,885 A | * | 11/1999 | Wilcox et al. | 323/285 |
| 6,127,815 A | * | 10/2000 | Wilcox | 323/282 |
| 6,239,509 B1 | | 5/2001 | Rader, III et al. | |
| 6,246,220 B1 | * | 6/2001 | Isham et al. | 323/224 |
| 6,304,066 B1 | * | 10/2001 | Wilcox et al. | 323/282 |

\* cited by examiner

*Primary Examiner*—Adolf Deneke Berhane
(74) *Attorney, Agent, or Firm*—Jaeckle Fleischmann & Mugel, LLP

(57) ABSTRACT

A DC-to-DC converter has a pulse width modulator PWM) and a hysteretic (ripple) modulator. For low current loads, the hysteretic modulator is selected; for high current loads, the PWM is selected. A mode selection switch senses the polarity of the switched output voltage at the end of each switching cycle. If the polarity changes from one cycle to the next, the mode may be instantly changed to the other mode. Counters are used to record the polarity at the end of each cycle and switching from one mode to another can be delayed by the counters to prevent changing modes based on spurious output voltage fluctuations.

11 Claims, 4 Drawing Sheets

DC TO DC CONVERTER METHOD AND CIRCUITRY

CROSS-REFERNCE TO RELATED APPLICATIONS

This application claims the benefit of U.S. Provisional Patent Application Serial No. 60/201,829, filed May 3, 2000.

BACKGROUND

Power supplies for computers, personal digital assistants, cellular phones and other hand held mobile electronic devices and systems have exacting demands. Two types of converters are used to meet these demands. One type is a pulse width modulated (PWM) converter and the other is a hysteretic (ripple) converter. A typical single mode DC-to-DC converter 8 with either a PWM or hysteretic controller is shown in FIG. 1a. The converter 8 has a PWM controller 12 or a hysteretic controller 14. The output of the controller drives the gates of output switches, typically upper and lower mosfet power transistors 16, 18. The mosfets are connected together at a switching node 20. At high output current levels, the PWM controller with a synchronous rectifier provides efficient and controllable output regulation. For low output currents, the efficiency of the DC-to-DC converter operating in a fixed frequency PWM mode gets lower because PWM switching losses become dominant. One the other hand, the hysteretic converter is efficient for low output currents but is not efficient for high output currents.

Demands on a system can change from tens of amps to milliamps in as short a time as a few microseconds. In order to address the variable and frequently inconsistent current requirements, many DC-to-DC converters, especially those used in mobile systems, include both a pulse width modulation (PWM) converter and a hysteretic converter. Such dual mode controllers provide a high efficiency over a wide range of load current levels.

A typical dual mode converter 10 is shown in FIG. 1b. The converter 10 has a PWM controller 12 and a hysteretic controller 14. The output of the controller drives the gates of upper and lower mosfet power transistors 16, 18. The mosfets are connected together at a switching node 20. The switching node 20 is connected to an inductor 22 that is connected to a parallel network comprising an output capacitor 23 and a load as represented by resistor 24. A sense resistor 26 is connected in series with the inductor 22. The voltage across the sense resistor is coupled to the controller 10 to provide data on the load current. A comparator 13 in the controller receives the voltage signal from the sense resistor 26, compares it to a reference value indicative of a critical current, and operates a switch to switch the controller between the PWM modulator 12 and the hysteretic controller 14 when the sensed current falls below the threshold value of the reference input to the comparator.

At high output current levels, the PWM controller with a synchronous rectifier provides efficient and controllable output regulation. As the load current gets lower, the efficiency of the DC-to-DC converter operating in a fixed frequency PWM mode gets lower because PWM switching losses become dominant. A simple hysteretic (ripple) controller improves the converter efficiency for light loads. The integrated circuit senses the load current and, when load current falls below a minimum threshold, it invokes the hysteretic (ripple) controller and disables the PWM controller. When the load current increases above the minimum threshold, the PWM controller resumes control. In this way high efficiency is maintained over a wide range of load currents.

The optimal transition point for the threshold current usually lies at the current level where the inductor current becomes "critical." Critical current is a value of load current for which the total energy stored in the inductor 22 is delivered to the load each cycle. At load currents below the critical value, the inductor current must go through zero and reverse direction at some point in the cycle. When the inductor current changes direction, energy is taken from the output filter capacitor 23 due to the bidirectional conductivity of the synchronous rectifier, lower fet 18. To maintain the output in regulation more energy will be delivered to the filter capacitor 23 at the next operating cycle. Unless the controller is switched to the hysteretic controller 14, the converter efficiency dramatically degrades. Power and energy are wasted. In mobile systems that rely on battery power, the overall life of the system is likewise reduced.

To prevent the energy losses when operating at subcritical currents, diode-like conduction is required of the lower mosfet 18. This assures discontinuous inductor current operation. Operating the converter 10 in the discontinuous conduction mode under fixed PWM mode control creates its own challenges because the small-signal loop becomes broken, closed-loop gain increases and the converter easily becomes unstable. This leads to the conclusion that hysteretic mode is preferred for safe, stable and efficient operation at sub-critical current.

In order to select the PWM or the hysteretic mode of operation, the controller 10 senses the load current or any current in the circuit proportional to the load current and compares the sensed load current to a reference. If the load current is higher than the reference, the PWM mode of operation is activated. Otherwise, the converter 10 operates in the hysteretic mode. This widely used approach depends on the tolerance of the currently sensing circuitry. As the output voltages of DC-to-DC converters for modem computer applications are getting lower and the output currents are getting higher and vary widely over short periods of time, it is becoming very difficult to measure the current precisely and efficiently. This leads to increased uncertainty of the switch over point and, therefore, to unpredictable operation of the whole converter.

SUMMARY

The invention is a new DC-to-DC converter circuit and a method for DC to DC conversion. The circuit includes a pulse width modulator controller and a hysteretic controller. Both controllers convert an input first voltage into an output second voltage during a series of repeated switching cycles. The circuit has a mode selection circuit for selecting one of the two controllers in accordance with the current demand of a load coupled through an inductor to the second voltage. The mode selection switch has a comparator for comparing the second voltage to a reference voltage (ground) for sensing the polarity of the second voltage at the end of each switching cycle. The polarity of the output voltage at the end of the switching cycle is a measure of the state of the inductor. If the inductor is in continuous operation and the load current is above the critical current, then the polarity of the switch node will be positive. If the inductor is in discontinuous operation, then the polarity of the switch node will be negative.

One or more counters are coupled to the comparator and to the mode selection switch. The counters record the polarity of the second voltage at the end of each switching cycle and keep that data for a given number of cycles. If the polarity of the switch node does not change, then the controller remains in whichever mode (PWM or hysteretic) that it has been operating in. By using counters, the invention avoids premature switching for a single change in polarity. Such changes may occur for spurious reasons that are not related to enduring load conditions. As such, the counters maintain the mode selection switch in its current mode so long as the polarity of the second voltage at the end of each cycle does not change. However, when the polarity changes and the changes endure for more than n switching cycles, then the counters operate the mode selection switch to change the mode of operation to the other mode. If the converter was operating in the PWM mode, then it is switched to the hysteretic mode and vice versa.

The DC-to-DC converter circuit operates to switch the mode selection switch to the hysteretic mode controller when the polarity of the second voltage for n number of cycles is positive and to switch the mode selection switch to the pulse width modulator controller when the polarity of the second voltage for n number of cycles is negative. There are separate counters for counting the positive and negative cycles. The number n may be the same or different for both counters.

DETAILED DESCRIPTION OF THE INVENTION

Figure 1A:
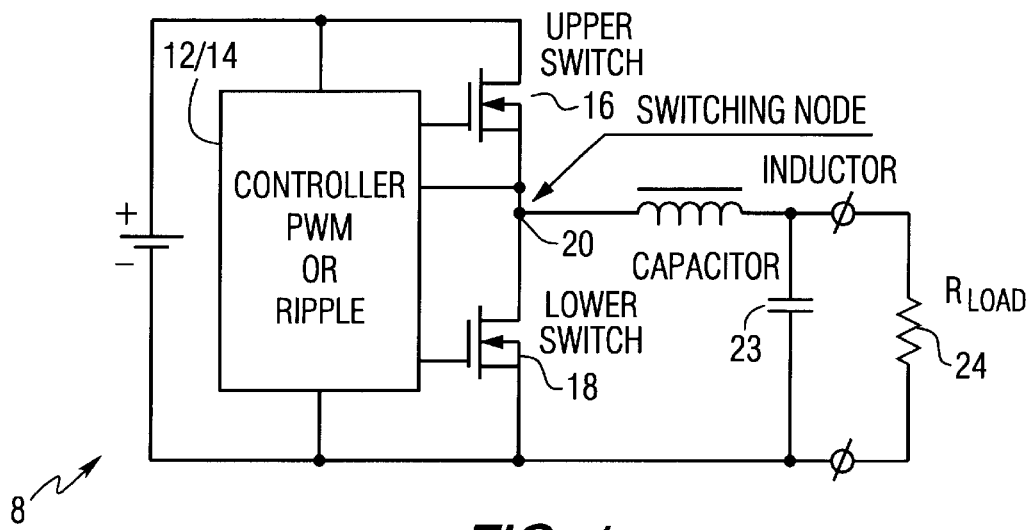
FIG. 1a is a schematic of a single mode DC-to-DC converter.
Figure 1B:
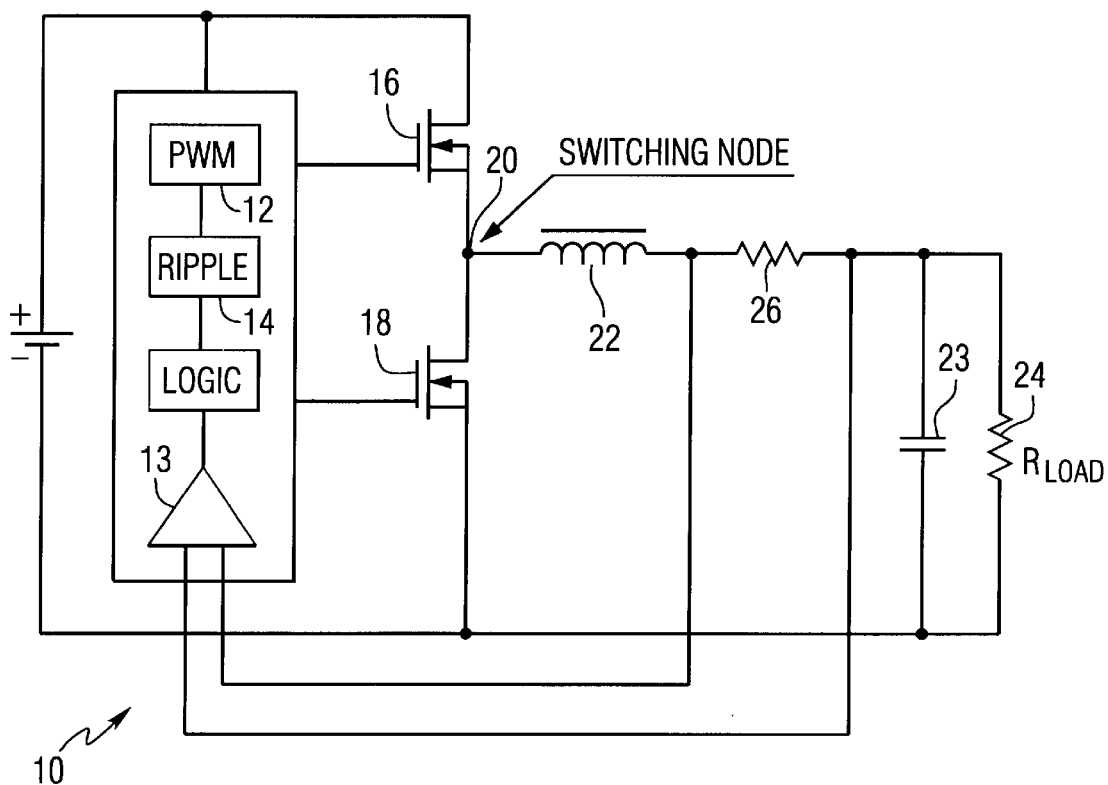
FIG. 1b is a schematic of a dual mod DC-to-DC converter.
Figure 2A:
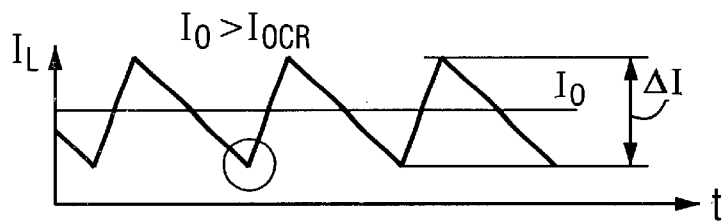
FIGS. 2a–2c are graphs of the converter performance during continuous conduction.
Figure 2B:
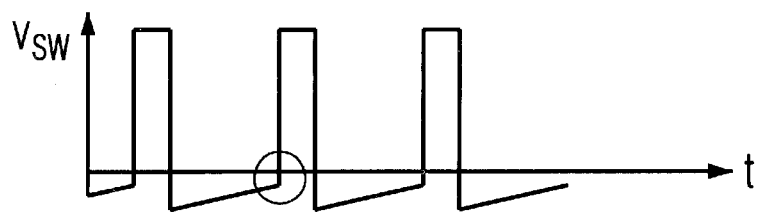
Figure 2C:
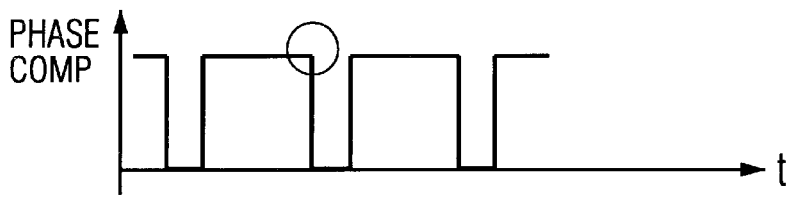
Figure 2D:
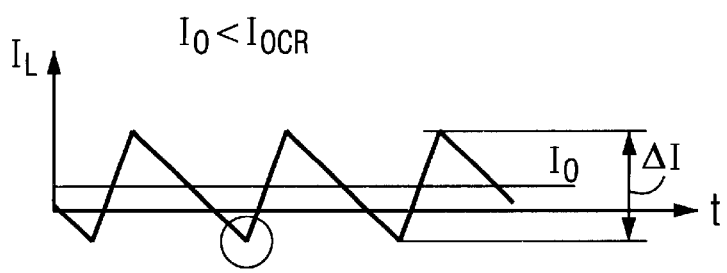
FIGS. 2d–2f are graphs of the converter performance during discontinuous conduction.
Figure 2E:
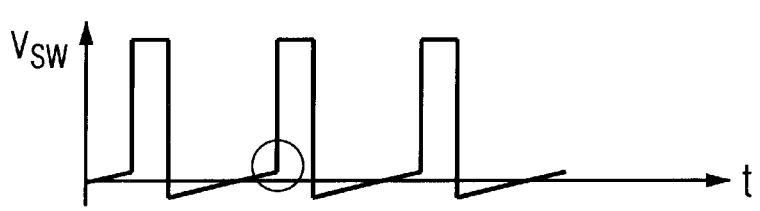
Figure 2F:
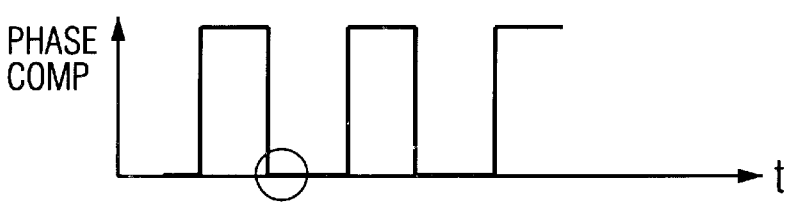

The new method and circuit to control the operation mode of a DC to DC converter are based on detection of the difference in the voltage waveform on the switching node of the converter. The polarity of the switch node voltage at the end of a switch cycle depends upon whether the filter inductor current is continuous (and therefore above the critical current) or discontinuous (and below the critical current). FIGS. 2a–2c show conditions where there is continuous inductor current. The switching cycle ends with a negative voltage on the switching node. FIGS. 2d–2f show conditions where the inductor current is discontinuous and the voltage at the end of the switching cycle is a positive voltage. In a simple buck converter, with only a diode for low-side current conduction, the switching node voltage at the end of the cycle will ring to a relatively large voltage greater than the output voltage of the regulator, In a synchronous rectifier buck converter, the current reversal forces the switching node to a small positive voltage determined by the resistance of the synchronous switch.

Figure 3:
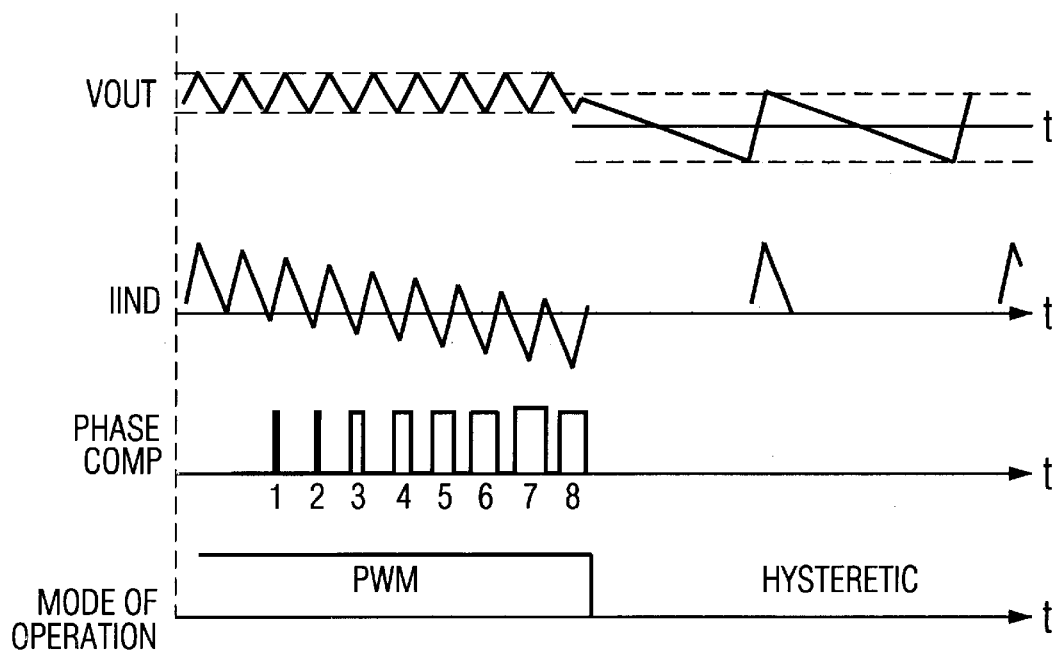
FIGS. 3 are graphs of the invention operation during PWM and hysteretic operations.
Figure 4:
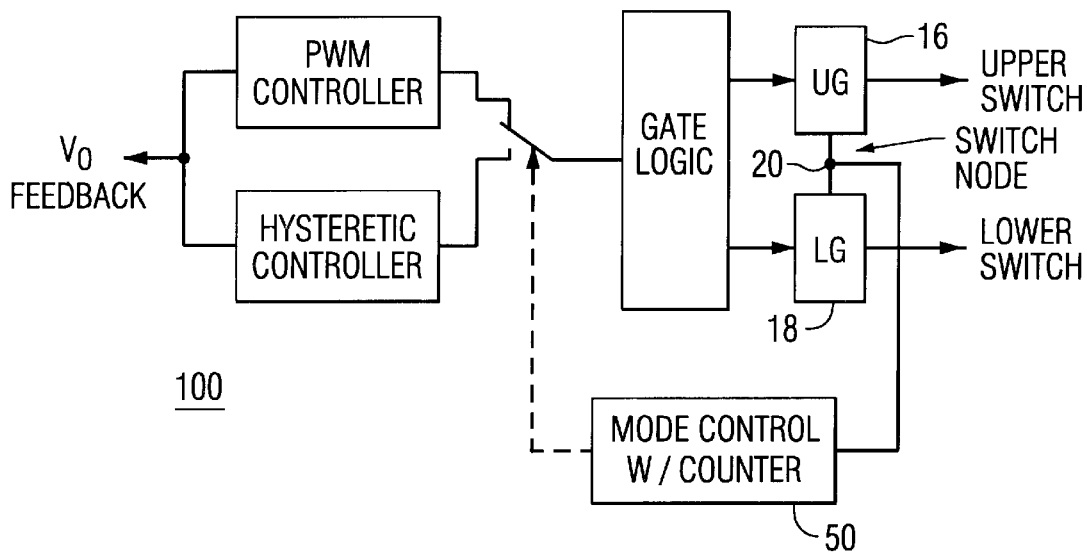
FIG. 4 is a schematic of a mode-controlled DC-to-DC controller.

Turning to FIG. 4, the dual mode converter 100 of the invention has a mode control switch 50 that monitors the polarity of the voltage at the switching node 20 between the upper and lower mosfets 16, 18. The polarity of the output voltage could be monitored at a number of other locations. For example, one skilled in the art could insert a small (a few milliohms) resistor in series between the lower mosfet 18 and ground. FIG. 3, top, shows the DC output voltage, during a PWM mode and a subsequent hysteretic mode. When the converter operates in PWM mode and load current decreases, the inductor current $I_{IND}$ gradually falls and the polarity signal (phase comparator) has wider pulses. A counter in the mode switch 50 counts the number of pulses of the new polarity and after n pulses (in this case n=8) in a row, the mode switches from PWM to hysteretic. A corresponding switch from hysteretic to PWM is made when the inductor current $I_{IND}$ increases and the polarity shifts again. An embodiment of the counters and logic circuitry are shown in FIG. 5 and discussed below.

The invention uses a finite storage interval of n switching cycles. If the sign of the switching node voltage at the end of each of n cycles remains unchanged, its sign is used to determine the subsequent mode of operation. A positive voltage on the switching node corresponds with the hysteretic operating mode; a negative voltage corresponds to the pulse width modulation mode. If at least once during these n switching cycles, the sign of the switching node changes, the counter is reset and the operating mode of the converter remains unchanged. The monitoring process constantly repeats itself while the converter is operating.

Figure 5:
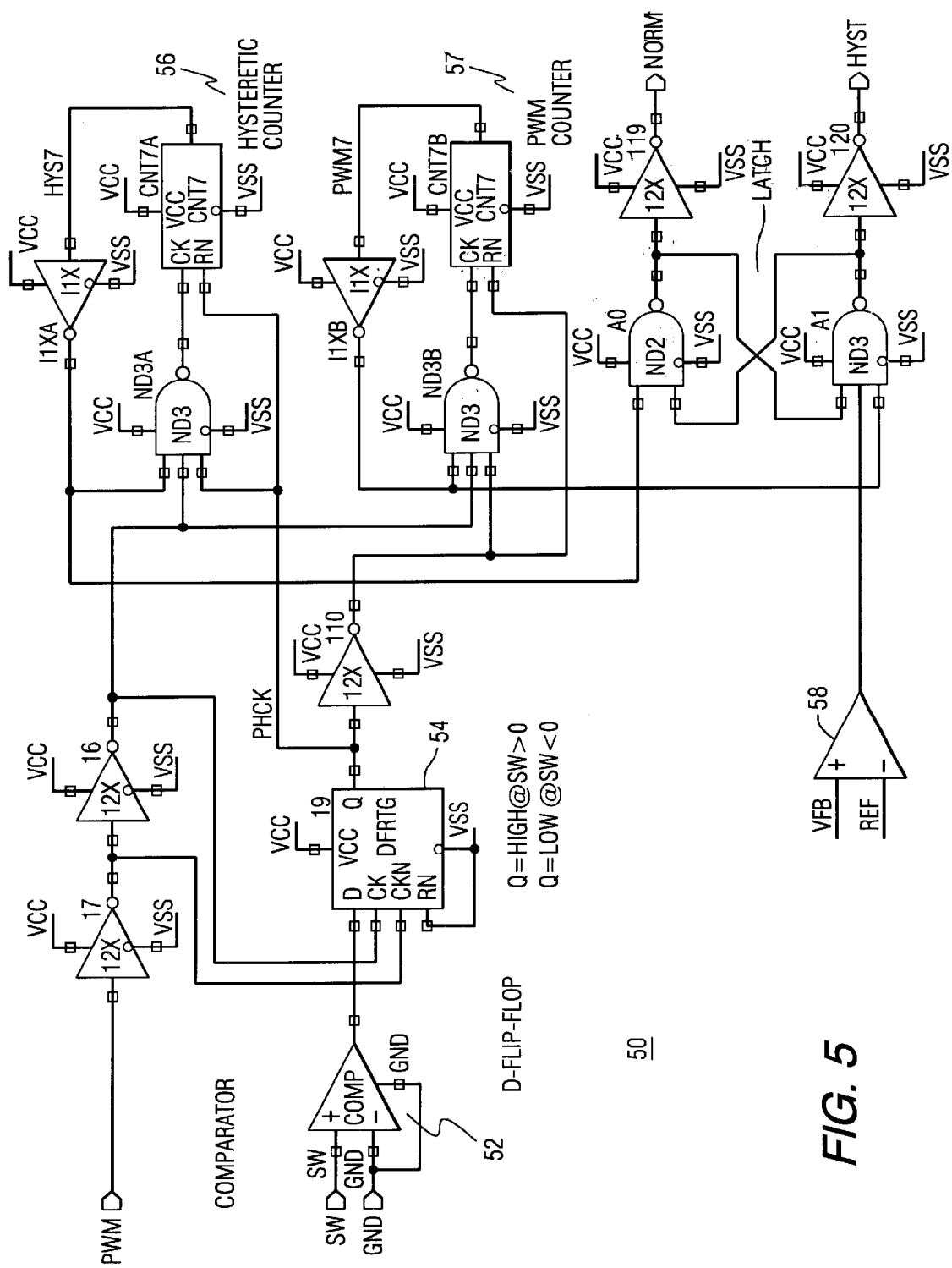
FIG. 5 is a detailed schematic of a mode-controlled DC-to-DC controller that includes the invention.

FIG. 5 shows a detailed schematic of a possible embodiment of the mode control switch with counters for and polarity sensors for distinguishing continuous from discontinuous currents in the inductor. The mode switch 50 includes a comparator 52 that compares the switching node to ground. The output of comparator 52 is clocked to the input of D-flip-flop 54 by the PWM signal. Two counters 56, 57 count to eight cycles, one counting positive switch node voltage, the other, negative. The counters 56, 57 are reset when the clocked switch node polarity (Q output of 54) changes. In the preferred embodiment each counter uses a count of eight to invoke the appropriate operating mode. However, the number of counts is arbitrary. The mode switch circuit 50 also provides a means to override the HYSTERETIC-to-PWM delay or counter in order to permit fast response to load current transients. The embodiment of this means in the mode switch control 50 uses a comparator 58 for monitoring the output feedback voltage and causing an immediate resetting of the MODE latch out of the HYSTERETIC mode when the feedback voltage is below the reference by an amount set to be greater than the normal ripple voltage expected. In other words, the delay of eight cycles in going from HYSTERETIC to PWM mode can be entirely eliminated via this means. A PWM reset comparator 58 compares the output voltage on the load VFB to a reference voltage. If VFB is greater than the reference, the circuit 50 immediately switches to the PWM mode. The reference is set to detect large output voltages. If the triggering voltage is spurious, the circuit 50 will reset to the HYSTERETIC mode after n cycles.

In operation, the invention provides a method to control the operation of a DC-to-DC converter 10 based on monitoring the waveform on the junction node 20 of the mosfets 16, 18 and the filter inductor. The mode switch controls the operation mode of a DC-to-DC converter based on monitoring the polarity of the voltage waveform on the junction node 20 of the mosfet switches 16,18 and the filter inductor 22. The voltage on this switching node 20 at the end of a switching cycle is detected and a signal indicating the sign of this voltage is stored for a finite interval of time, which is longer than one switching cycle and determined by practical considerations. If during this interval of time, there are several switching cycles all of the same sign of voltage at the switching node at the end of the switching cycle, a decision is made that the operating mode will be in correspondence with the stored sign of the voltage on the switching node. Positive voltage corresponds with a hysteretic operating mode. The negative sign corresponds with the PWM operating mode.

If at least once during the measuring time interval, the sign of the switching node changes, the operating mode of the converter remains unchanged. The monitoring process constantly repeats itself while the converter is operating.

Having thus described the preferred embodiment of the invention, those skilled in the art will understand that further changes, additions, deletions and modifications may be made to this embodiment without departing from the spirit and scope of the invention as set forth in the appended claims.

What we claim is:

1. A DC-to-DC converter circuit comprising:
   a pulse width modulator controller and a hysteretic controller, each controller for converting a first voltage into a second voltage during a series of repeated switching cycles;
   a mode selection circuit for selecting one of the two controllers in accordance with the current demand of a load coupled to the second voltage;
   a comparator for comparing the second voltage to a reference voltage and generating a polarity signal representative of the second voltage at the end of each switching cycle; and
   one or more counters coupled to the comparator and to the mode selection switch for recording the polarity of the second voltage at the end of each switching cycle, for maintaining the mode selection switch in its current mode so long as the polarity of the second voltage at the end of the each cycle is the same as the last n number of cycles and for operating the mode selection switch to select the other controller when the polarity of the second voltage at the end of the cycle changes from the prior cycle and the change in polarity persists for n number of cycles.

2. The DC-to-DC converter circuit of claim 1 wherein the counters operate to switch the mode selection switch to the hysteretic mode controller when the polarity of the second voltage for n number of cycles is positive.

3. The DC-to-DC converter circuit of claim 1 wherein the counters operate to switch the mode selection switch to the pulse width modulator controller when the polarity of the second voltage for n number of cycles is negative.

4. A DC-to-DC converter comprising:
   means for pulse width modulating and ripple modulating a first voltage to convert the first voltage into a second voltage during a series of repeated switching cycles;
   means for selecting one of the two modulating means in accordance with the current demand of a load coupled to the second voltage;
   means for sensing the polarity of the second voltage at the end of the switching cycles; and
   means for switching from one modulating means to the other modulating means when the polarity of the second voltage changes at the end of the switching cycle.

5. The converter of claim 4 wherein the means for sensing the polarity of the second voltage comprises
   means or comparing the second voltage to a polarity reference voltage;
   means for generating a polarity signal representative of the polarity second voltage at the end of each switching cycle;
   means for recording the polarity of the second voltage at the end of each switching cycle for n number of cycles;
   means for maintaining the current modulating means so long as the polarity of the second voltage at the end of the each cycle is the same as the last n number of cycles; and
   means for selecting the other modulation means when the polarity of the second voltage at the end of the cycle changes from the prior cycle and the change in polarity persists for n number of cycles.

6. The converter of claim 4 wherein the means for selecting selects the ripple modulation means when the polarity of the second voltage for n number of cycles is positive.

7. The converter of claim 4 wherein the means for selecting selects the pulse width modulation means when the polarity of the second voltage for n number of cycles is negative.

8. A method for converting one DC voltage into another DC voltage comprising:
   pulse width modulator mode and a hysteretic modulator mode for generating a second voltage during a series of repeated switching cycles;
   selecting one of the two modes in accordance with the current demand of a load coupled to the second voltage;
   sensing the polarity of the second voltage at the end of the switching cycles; and
   maintaining the current mode so long as the polarity of the second voltage at the end of the each cycle is the same as the last n number of cycles; and
   selecting the other mode when the polarity of the second voltage at the end of the cycle changes from the prior cycle and the change in polarity persists for n number of cycles.

9. The method of claim 8 wherein the hysteretic mode is selected when the polarity of the second voltage for n number of cycles is positive.

10. The method of claim 9 wherein the step of sensing the polarity of the second voltage comprises:
    comparing the second voltage to a polarity reference voltage;
    generating a polarity signal representative of the polarity second voltage at the end of each switching cycle; and
    recording the polarity of the second voltage at the end of each switching cycle.

11. The method of claim 8 wherein the pulse width modulation mode is selected when the polarity of the second voltage for n number of cycles is negative.

* * * * *